(12) United States Patent
Molnar

(10) Patent No.: US 7,980,891 B2
(45) Date of Patent: Jul. 19, 2011

(54) INTEGRATED DIN RAIL ATTACHMENT FEATURE FOR OPTIMIZED CONSTRAINT

(75) Inventor: Nathan J. Molnar, Shaker Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 60 days.

(21) Appl. No.: 12/435,570

(22) Filed: May 5, 2009

(65) Prior Publication Data
US 2010/0285690 A1 Nov. 11, 2010

(51) Int. Cl.
H01R 13/60 (2006.01)

(52) U.S. Cl. ........................................ 439/532; 361/735

(58) Field of Classification Search .............. 439/94, 439/532, 716; 361/729, 732, 735, 807, 809, 361/810
See application file for complete search history.

(56) References Cited

U.S. PATENT DOCUMENTS

| | | | | |
|---|---|---|---|---|
| 4,067,529 A | * | 1/1978 | Milcoy | 248/222.12 |
| 4,921,445 A | * | 5/1990 | Herbert | 439/532 |
| 5,904,592 A | | 5/1999 | Baran et al. | |
| 5,907,476 A | | 5/1999 | Davidsz | |
| 6,120,000 A | * | 9/2000 | Aeschbach et al. | 248/694 |
| 6,157,287 A | | 12/2000 | Douglass et al. | |
| 6,431,909 B1 | | 8/2002 | Nolden et al. | |
| 6,475,036 B2 | | 11/2002 | Morikawa | |
| 6,563,697 B1 | | 5/2003 | Simbeck et al. | |
| 6,935,903 B2 | * | 8/2005 | Gaidosch | 439/716 |
| 7,059,898 B2 | | 6/2006 | Barile | |
| 7,073,971 B2 | * | 7/2006 | Schurr et al. | 403/325 |
| 7,516,927 B2 | * | 4/2009 | Portal | 248/221.11 |
| 7,758,368 B2 | * | 7/2010 | Schelonka et al. | 439/325 |

FOREIGN PATENT DOCUMENTS

| | | |
|---|---|---|
| DE | 100 12 764 A1 | 9/2001 |
| DE | 197 48 530 B9 | 9/2004 |

* cited by examiner

*Primary Examiner* — Thanh-Tam T Le
(74) *Attorney, Agent, or Firm* — Fay Sharpe LLP; R. Scott Speroff; John M. Miller

(57) ABSTRACT

An electronics module includes a base including a recess adapted to receive an associated mounting rail such as a DIN rail. At least one rail constraining tab is located adjacent a first side of the recess and is adapted to capture a first flange of the associated mounting rail in the recess. First and second flexible resilient latch arms are located adjacent a second side of the recess. The first and second flexible latch arms include respective first and second locking tabs connected thereto, wherein the first and second locking tabs project into the recess and are located to capture a second flange of the associated mounting rail in the recess when the first and second latch arms are in respective latched positions, and wherein the first and second locking tabs are withdrawn from the recess when the first and second latch arms are in respective unlatched positions.

17 Claims, 7 Drawing Sheets

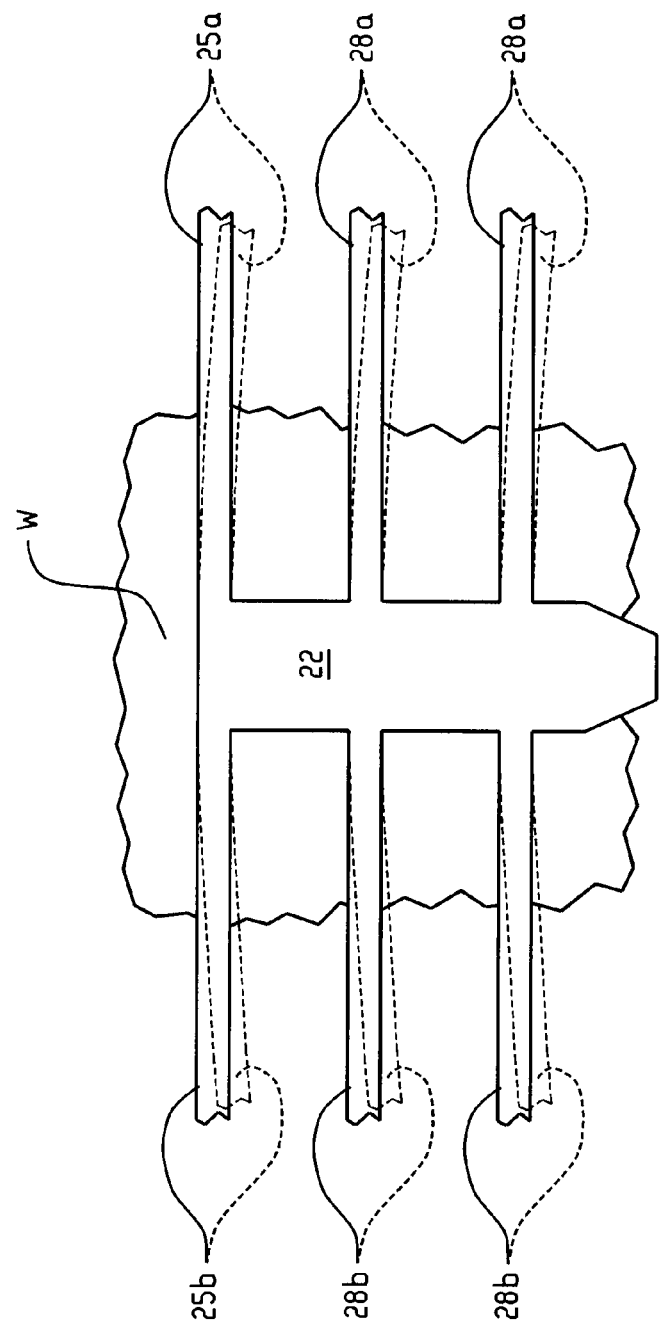

INTEGRATED DIN RAIL ATTACHMENT FEATURE FOR OPTIMIZED CONSTRAINT

BACKGROUND

It is known to provide an electronics module with an attachment feature for releasably securing the module to a DIN rail, which is an industry standard mounting structure. Many known DIN rail attachment features include one or more latches that are defined separately from the electronics module and that are movably connected to the module. Such latches are manually movable between an unlatched position, for connecting/disconnecting the module to/from the DIN rail, and a latched position for fixedly securing the module to the DIN rail. This type of attachment feature is effective, but requires the latch(es) to be separately constructed (e.g., injection molded) and then assembled to the module, which increases product cost. In other prior devices, the electronic module includes a base, and a latch is connected to the base as a one-piece molded polymeric construction, wherein one or more flexible webs or members interconnect the latch to the base and accommodate movement of the latch between its unlatched and latched positions. These prior types of known attachment features have not provided sufficient redundant latching and/or single-operation unlatching, and have otherwise been deemed suboptimal.

In light of the foregoing, a need has been identified for an electronics module including an improved attachment feature that is defined as a one-piece construction with a base of the module and that provides for redundant latching while also providing single point disengagement.

SUMMARY

In accordance with one aspect of the present development, a base for an electronics module includes a main wall and a recess defined in a rear face of the main wall. The recess is adapted to receive first and second flanges of an associated mounting rail. A first rail-constraining tab is located on a first side of the recess. A latch is located on a second side of the recess that is opposite the first side of the recess. The latch comprises: (i) an anchor; (ii) first and second latch arms connected to the anchor and projecting outwardly away from the anchor in opposite first and second directions; (iii) first and second locking tabs projecting respectively from the first and second latch arms. The first and second latch arms are selectively manually flexible between: (i) a latched position in which the first and second locking tabs project into the recess; and (ii) an unlatched position in which the first and second locking tabs are withdrawn from the recess as compared to the latched position.

In accordance with another aspect of the present development, a rail attachment feature for an electronics module includes a recess adapted to receive an associated mounting rail. At least two spaced apart tabs are located adjacent a first edge of the recess and are adapted to capture a first flange of the associated mounting rail in the recess. First and second flexible resilient latch arms are located adjacent a second edge of the recess. The first and second flexible latch arms include respective first and second locking tabs connected thereto, wherein the first and second locking tabs project beyond the second edge of the recess and are adapted to capture a second flange of the associated mounting rail in the recess when the first and second latch arms are in respective latched positions. The first and second locking tabs do not project beyond the second edge of the recess when the first and second latch arms are in respective unlatched positions. The first and second latch arms are located in a common plane and are movable in the common plane between their respective latched and unlatched positions.

In accordance with another aspect of the present development, an electronics module includes a base including a recess adapted to receive an associated mounting rail. At least one rail constraining tab is located adjacent a first side of the recess and is adapted to capture a first flange of the associated mounting rail in the recess. First and second flexible resilient latch arms are located adjacent a second side of the recess. The first and second flexible latch arms include respective first and second locking tabs connected thereto, wherein said first and second locking tabs project into the recess and are located to capture a second flange of the associated mounting rail in the recess when the first and second latch arms are in respective latched positions, and wherein the first and second locking tabs are withdrawn from the recess when the first and second latch arms are in respective unlatched positions. The first and second latch arms are located in a common plane and move between their respective latched and unlatched positions in the common plane.

BRIEF DESCRIPTION OF DRAWINGS

FIG. 7 is a partial view of the latch frame showing its manually deflection from the locked position (solid lines) to the unlocked position (broken lines).

DETAILED DESCRIPTION

Figure 1:
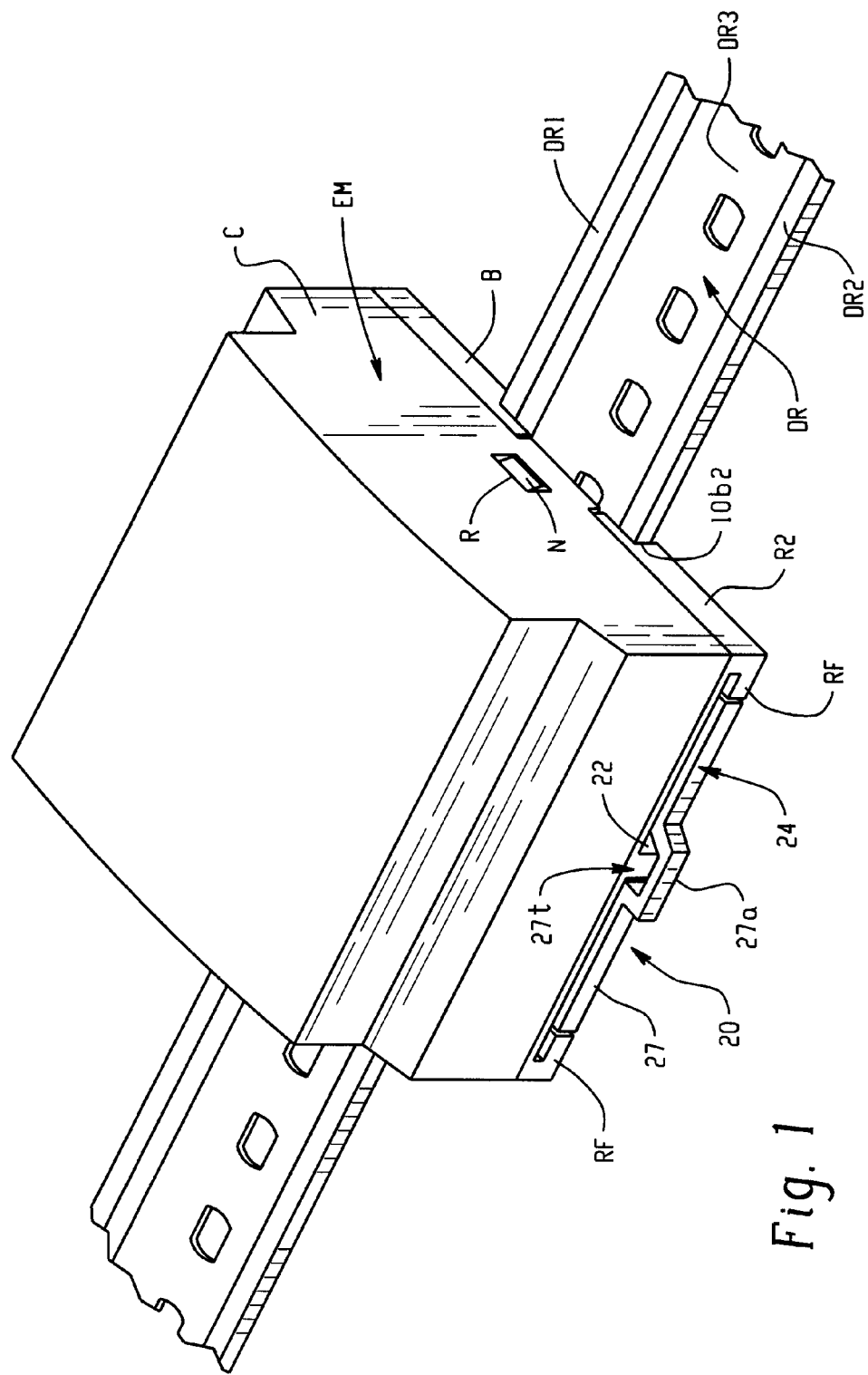
FIG. 1 is an isometric view of an electronics module including an attachment feature in accordance with the present development, mounted on a conventional DIN rail.

FIG. 1 shows a conventional DIN rail mounting structure DR including first and second flanges DR1,DR2 connected to opposite side of a recessed central portion DR3. An electronics module EM includes DIN rail attachment features in accordance with the present development. The attachment features provide a means for releasably connecting the module EM to the DIN rail. The electronics module EM includes a base B for supporting one or more electronic circuit boards or other electronic components, and a cover C that is connected to the base B for enclosing the electronic components connected to the base B. In the illustrated example, the base B includes first and second legs L1,L2 (FIG. 2) that are received within the cover C and that include respective nibs N that engage mating recesses R of the cover C with a releasable snap fit.

Figure 2:
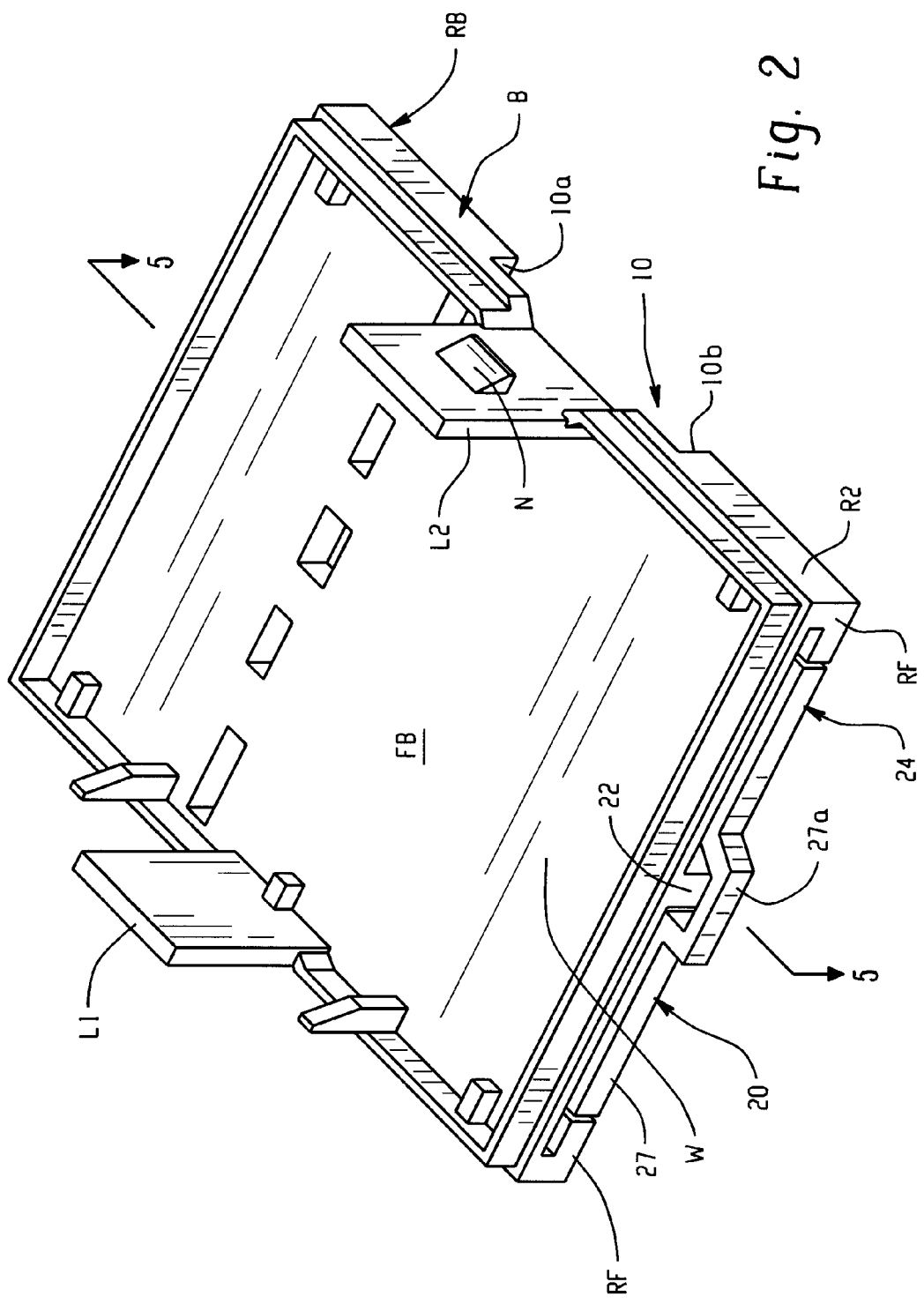
FIG. 2 is an isometric view of the front of the base portion of the module of FIG. 1.
Figure 3:
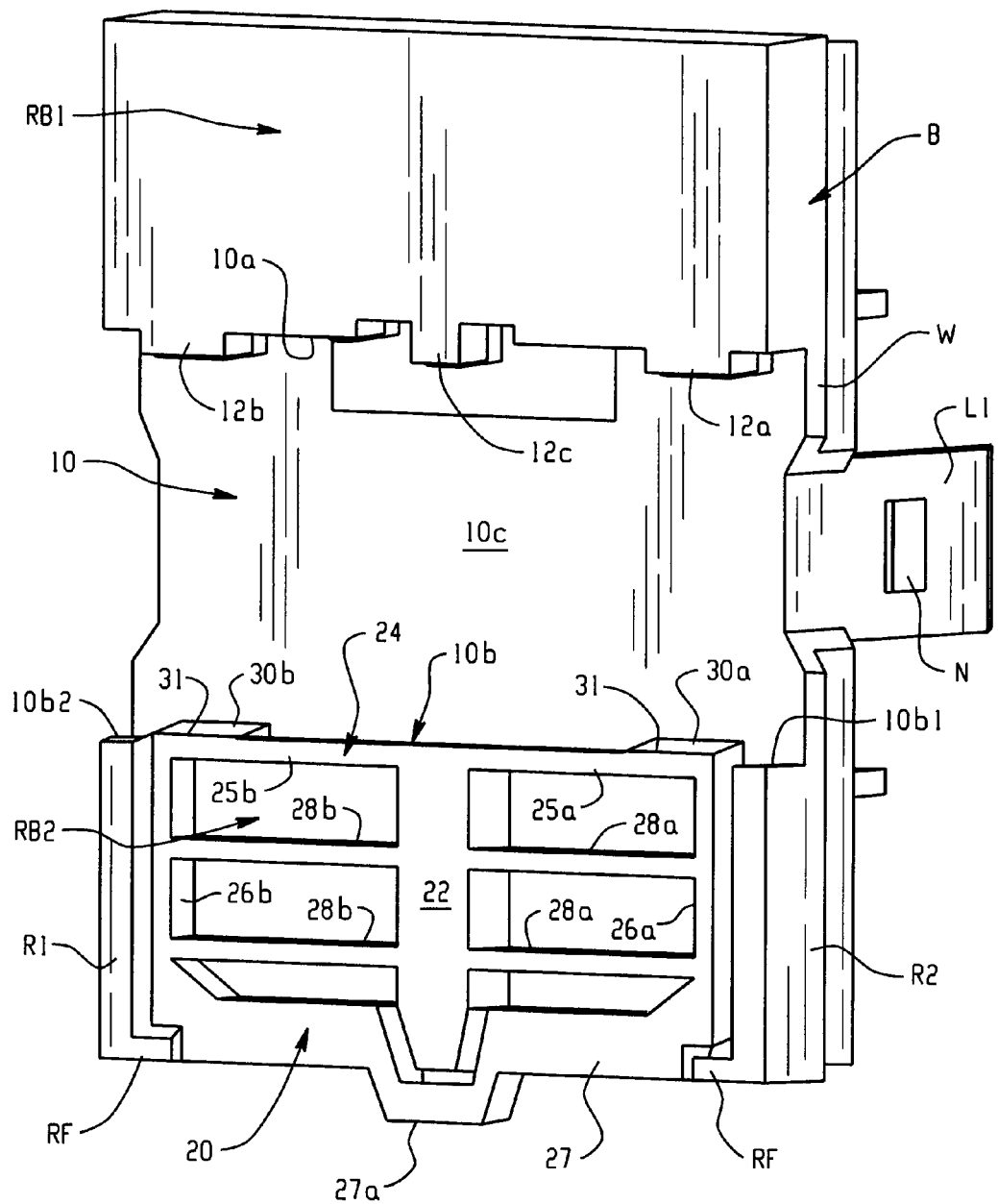
FIG. 3 is an isometric view of the rear of the base portion of the module of FIG. 1.

With reference now to all of FIGS. 1-3, the base B is defined as a one-piece molded polymeric or "plastic" construction, and the attachment features are defined as part of the one-piece construction of the base B. The base B comprises a main wall W that extends in a plane parallel to the plane in which the DIN rail flanges DR1,DR2 extend. A first side of the main wall W defines a front face of the base FB and a second side of the main wall W defines a rear face of the base RB. A recess 10 is defined in the rear face of the base RB and is adapted to receive the DIN rail DR for mounting the module EM to the rail. As can be seen in FIG. 3, the recess 10 is located between or divides the rear face RB of wall W between a first (upper) portion RB1 and a second (lower) portion RB2.

The recess 10 comprises first and second sides or edges 10a,10b that are located on opposite sides of its inner wall or face 10c. At least one fixed DIN rail-constraining tab, and preferably at least two laterally spaced-apart fixed DIN rail-constraining tabs 12a,12b project into the recess 10 from the first edge 10a inwardly toward the opposite second edge 10b. The tabs 12a,12b are preferably located respectively adjacent first and second lateral sides of the base B. As shown, a third fixed rail constraining tab 12c is centrally located between the first and second tabs 12a,12b. Although not preferred, the central, third rail-constraining tab 12c could be the only rail-constraining tab provided.

A latch 20 is defined as part of the base B and is located adjacent and/or defines all or part of the second edge 10b of the recess 10. As shown, the second edge 10b of the recess comprises first and second oppositely located fixed edge portions 10b1,10b2 (FIG. 3) and the latch 20 is located therebetween. The latch 20, which is shown in its free state which corresponds to its normally latched condition, comprises a base or anchor 22 that is fixed in position and that projects outwardly from the main wall W. In particular, the anchor is connected to and projects from the second portion RB2 of the rear face of the main wall W. The latch 20 further comprises a frame 24 that is connected to the anchor 22 but that is spaced from the main wall W and that is resiliently movable from its free or latched position (shown) to a deflected or unlatched position in a plane that is parallel to at least the second portion RB2 of the rear face of the main wall W. The frame 24 comprises first and second resilient, flexible latch arms 25a, 25b that project outwardly in opposite directions from opposite sides of the anchor 22. As shown, the first and second latch arms 25a,25b define at least part of the second edge 10b of the recess 10 between the first and second fixed ends 10b1,10b2 of the second edge 10b. The latch arms 25a,25b include respective inner ends connected to the anchor 22 and include respective first and second locking tabs 30a,30b that project from their respective outer ends. The latch arms 25a, 25b are joined together through the fixed anchor 22, and their outer ends are also interconnected to each other through the latch frame 24 including: (i) first and second outer legs 26a, 26b that are connected respectively to and that extend transversely from the latch arms 25a,25b in a direction away from the recess 10; and, (ii) a cross-bar 27 that extends between and interconnects the free ends of the first and second outer legs 26a,26b at a location spaced from the latch arms 25a,25b. The cross-bar 27 is not connected to the fixed anchor 22. At least one, and preferably at least two parallel, spaced-apart resilient, flexible biasing struts 28a extend from the fixed anchor 22 and are connected to the first outer leg 26a. Likewise, at least one, and preferably at least two parallel, spaced-apart resilient, flexible biasing struts 28b extend from the fixed anchor 22 and are connected to the second outer leg 26b.

Figure 4:
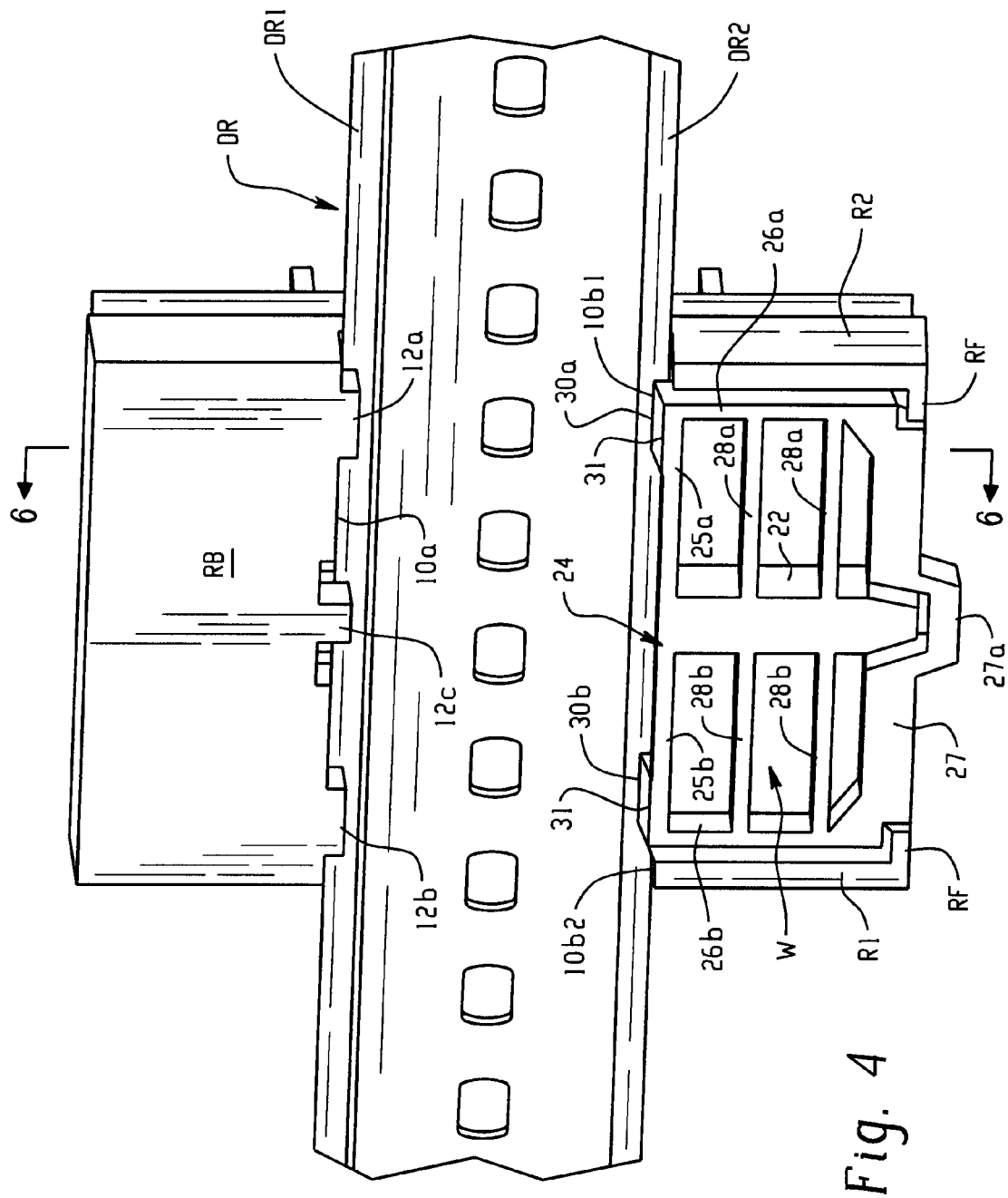
FIG. 4 is similar to FIG. 3, but shows the base portion mounted on a DIN rail.
Figure 5:
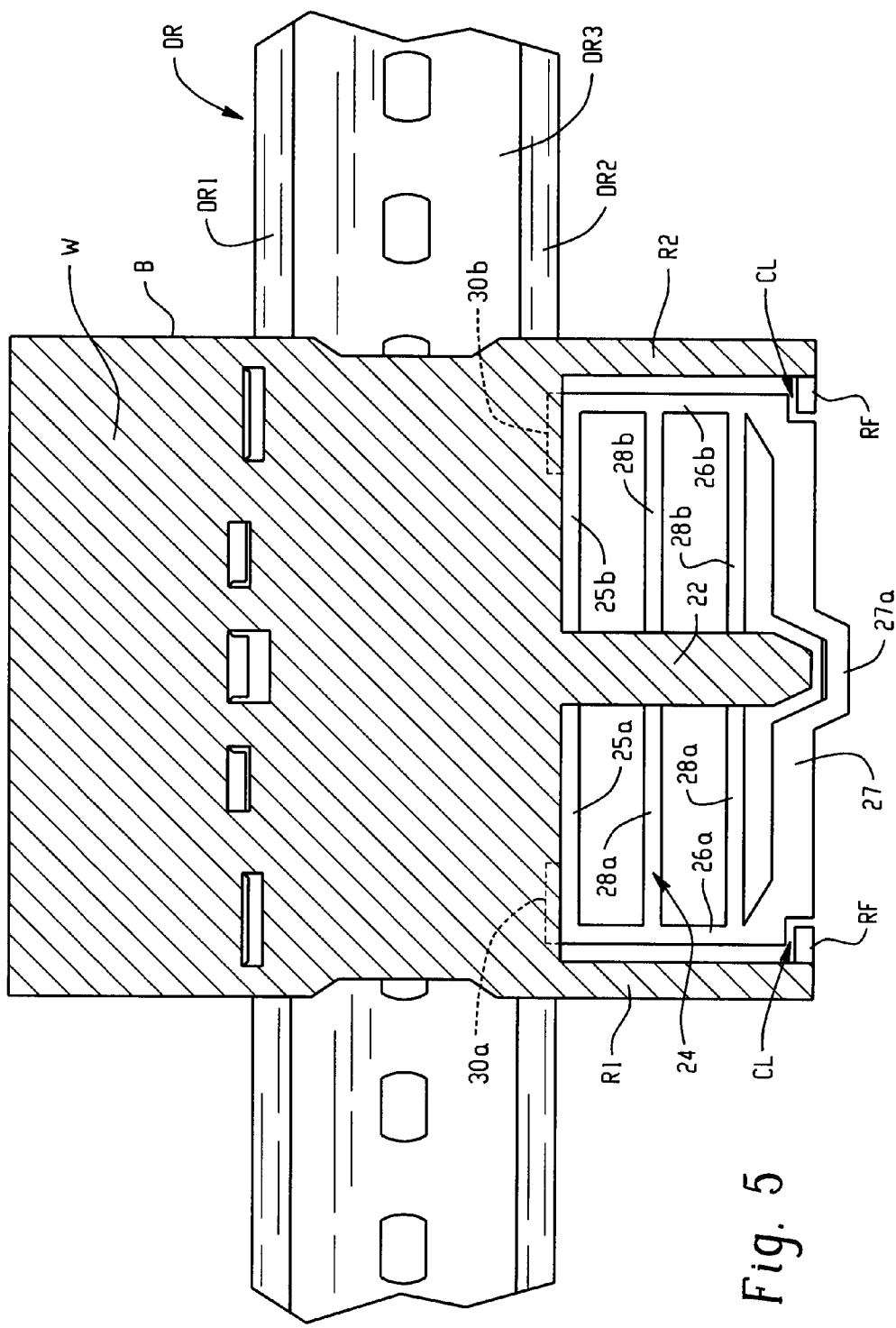
FIG. 5 is a section view of the base portion as taken at line 5-5 of FIG. 2, also showing the base portion connected to a DIN rail.
Figure 6:
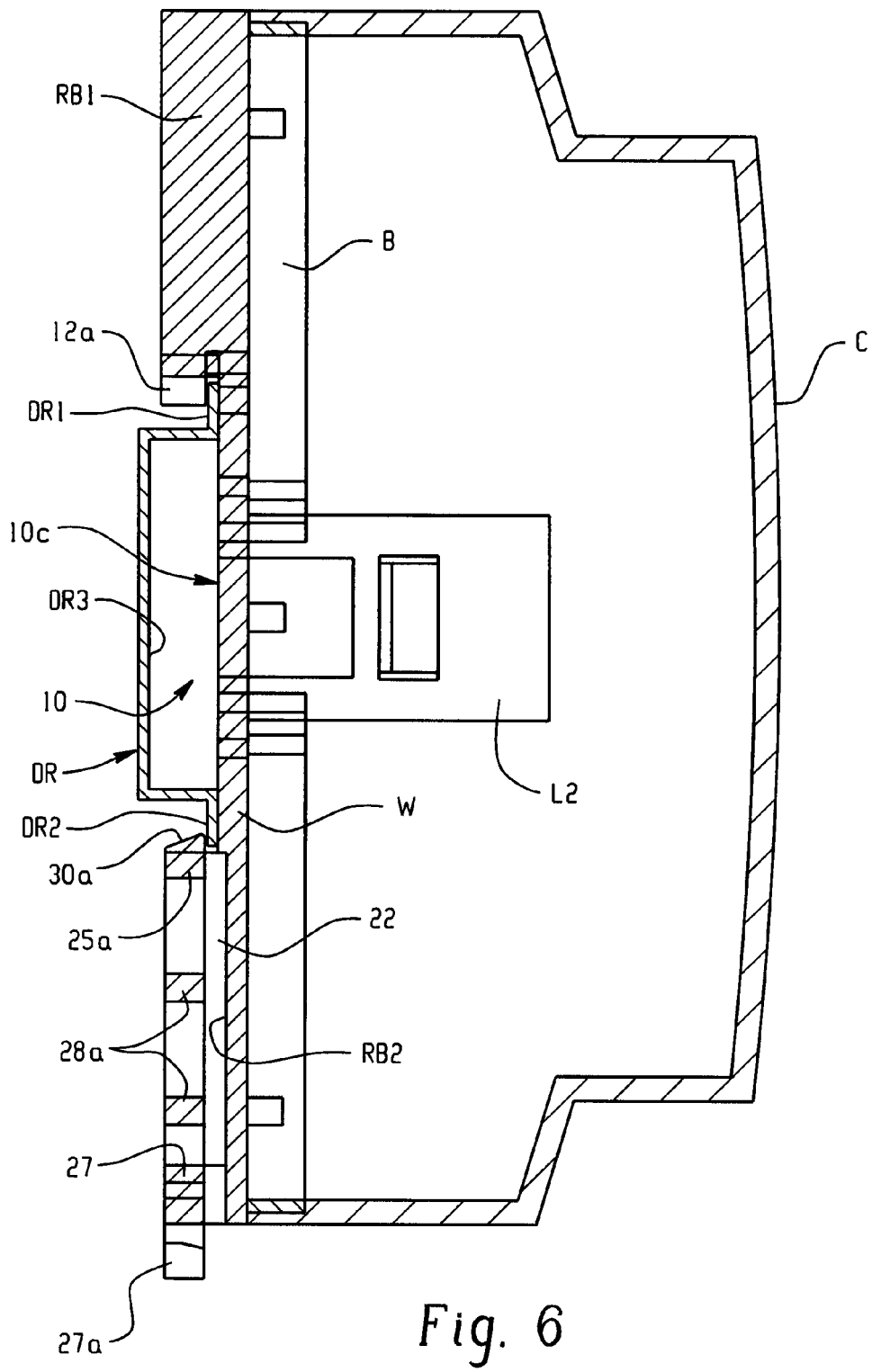
FIG. 6 is a section view of the base portion as taken at line 6-6 of FIG. 4.

As noted, the anchor 22 is fixed relative to the portion RB2 of the rear face of the main wall W. The latch arms 25a,25b, the first and second outer legs 26a,26b, the cross-bar 27 and the flexible biasing struts 28a,28b are directly or indirectly connected to the anchor 22, but are spaced from and resiliently movable relative to the portion RB2 of the main wall W (see also FIG. 6). The latch arms 25a,25b, the first and second outer legs 26a,26b, the cross-bar 27 and the flexible biasing struts 28a,28b all lie in, and move between the latched and unlatched positions in, a common plane that is parallel to and spaced-apart from at least the second portion RB2 of the rear face of the main wall W from which the anchor 22 projects. As shown in FIG. 7, the latch frame 24, including the latch arms 25a,25b, the first and second outer legs 26a,26b, the cross-bar 27 and the flexible biasing struts 28a,28b, is selectively manually movable from the latched position (solid lines) to the unlatched position (broken lines). When the latch frame 24 is in the latched position, the first and second locking tabs 30a,30b project beyond the second edge 10b into the recess 10 and are positioned to capture the second DIN rail flange DR2 in the recess 10 as shown in FIGS. 4-6. When the latch frame 24 is manually moved to its unlatched position (as shown in broken lines in FIG. 7), the first and second locking tabs 30a,30b are withdrawn from the recess 10, away from the opposite first edge 10a of the recess 10, so as to be flush with or recessed relative to the fixed portions 10b1,10b2 of the second edge 10b of the recess 10, and so that the locking tabs 30a,30b do not capture the second DIN rail flange DR2 in the recess 10 (and do not block insertion of a DIN rail into the recess 10).

The cross-bar 27 of the latch frame 24 includes at least one tool engagement portion 27a adapted to be engaged by a screwdriver blade or other tool that is used to deflect the latch frame 24 from its latched position to its unlatched position. In the illustrated embodiment, the tool engagement portion 27a is defined by a projecting central portion of the cross-bar 27 that extends around and generally conforms to the shape of an end of the fixed anchor 22 so that a narrow tool slot 27t (FIG. 1) is defined between the cross-bar 27 and the end of the anchor 22. The slot 27t is adapted for insertion of a blade of a tool (e.g., a flat blade of a screwdriver), and the blade can then be twisted and/or otherwise moved while a part of the blade is engaged with the end of the anchor 22, which will result in deflection of the latch frame 24 in a plane parallel to the plane in which the DIN rail flanges DR1,DR2 lie from its latched position to its unlatched position. The cross bar 27 and other portions of the frame 24 tie the latch arms 25a,25b together such that a single movement of the cross bar 27 away from the anchor 22 as described will cause both latch arms 25a,25b to be moved simultaneously from their latched positions to their unlatched positions to provide a "single-point" or "single-operation" unlatching in which one action simultaneously moves both latch arms 25a,25b from their latched positions to their unlatches positions.

It should also be noted that the first and second locking tabs 30a,30b preferably include respective ramp surfaces 31 that slope or extend toward the opposite edge 10a of the recess as they extend inwardly toward the recess inner face 10c, i.e., the ramp surfaces 31 are closer to the opposite edge 10a of the recess 10 as they extend inwardly toward the inner face 10c of the recess. This facilitates insertion of a DIN rail DR into the recess 10 for mounting the base B to the DIN rail as is described in further detail below.

As can be easily seen in FIGS. 3 and 5, the latch frame 24 is located between first and second side walls R1,R2 of the base. In the illustrated embodiment, the first and second side walls R1,R2 are part of the one-piece construction of the base B and are respectively connected to and/or define the fixed edge portions 10b1,10b2 of the recess lower edge 10b. At their respective ends opposite the fixed edge portions 10b1, 10b2, the first and second sidewalls R1,R2 terminate in respective feet RF that are turned inward and extend partly toward each other. At least part of the cross-bar 27 of the latch frame 24 is located between the feet RF with minimal lateral clearance between the cross-bar 27 and the feet RF so that the feet RF prevent undesired lateral deflection of the cross-bar 27 between the feet which could lead to inadvertent movement of the latch frame 24 to its unlatched position and/or which could damage the latch frame 24. Similarly, the feet RF define stops that limit movement of the latch frame 24 away from its latched position to its unlatched position. Specifically, when the latch frame 24 is in its latched position, a clearance or space CL (FIG. 5) is defined between the feet RF and the cross-bar 27. Manual deflection of the latch frame 24 beyond its unlatched position is prevented when the latch frame 24 contacts the feet RF such that the clearance CL is closed, which prevents over-deflection of the latch frame 24 which could damage same. In an alternative embodiment, only a single stop is provided (e.g., one of feet RF) to limit movement of the cross-bar 27 away from the anchor 22.

FIGS. 4-6 illustrate operation of the above-described DIN rail attachment features to secure the electronics module EM to an associated DIN rail DR. The latch frame 24 is normally latched, meaning that when it is in its free, undeflected state, the latch arms 25a,25b are located in their respective latched positions where the first and second locking tabs 30a,30b are extend into the recess 10 beyond the second edge 10b so as to be positioned to capture the second DIN rail flange DR2 in the recess 10. For mounting a module EM to a DIN rail, the base B of the module EM is moved into engagement with the DIN rail DR such that the first (upper) flange DR1 of the DIN rail moves into the recess 10 of the module base B and slides behind the fixed DIN rail constraining tabs 12a,12b,12c. Continued movement of the module B into engagement with the DIN rail DR will cause the second (lower) flange DR2 to contact the ramp surface 31 of the first and second locking tabs 30a,30b and will cause deflection of the first and second locking tabs 30a,30b and the latch arms 25a,25b to which they are respectively connected sufficiently to allow the DIN rail to move fully into the recess 10, at which stage the first and second latch arms 25a,25b and locking tabs 30a,30b will resiliently return to the latched state so as to capture the DIN rail second flange DR2 in the recess behind the tabs 30a,30b. As described above, the module EM is separated from the DIN rail DR by movement of the cross-bar 27 (using a tool) away from the anchor 22 so that the latch frame 24, including the latch arms 25a,25b is deflected to the unlatched position in which the locking tabs 30a,30b are withdrawn from the recess 10 (i.e., moved away from the first edge 10a of the recess) sufficiently to release the second DIN rail flange DR2.

The present development provides redundant latching in that failure of one of the latch arms 25a,25b will not cause failure or unlatching of the other latch arm 25a,25b. Even a failure of a latch arm 25a,25b and its corresponding biasing struts 28a,28b will not lead to failure of the other latch arm 25a,25b and its corresponding biasing struts 28a,28b. Also, the latch arms 25a,25b can remain in the latched condition even upon failure of multiple other portions of the frame 24 (e.g., failure of one or all of the struts 28a,28b).

It should also be noted again that the base B, including all of the DIN rail attachment features described above, is defined as a one-piece polymeric construction. As such, the main wall W, the recess 10, the tabs 12a,12b,12c, the latch 20 including the anchor 22 and latch frame 24 are all defined as parts of the same one-piece molded polymeric construction so that no assembly of separate components is required.

The development has been described with reference to preferred embodiments. Those of ordinary skill in the art will recognize that modifications and alterations to the preferred embodiments are possible. The disclosed preferred embodiments are not intended to limit the scope of the following claims, which are to be construed as broadly as possible, whether literally or according to the doctrine of equivalents.

The invention claimed is:

1. A base for an electronics module, said base comprising:
a main wall;
a recess defined in a rear face of the main wall, said recess adapted to receive first and second flanges of an associated mounting rail;
a first rail-constraining tab located on a first side of the recess;
a latch located on a second side of the recess that is opposite the first side of the recess, said latch comprising: (i) an anchor; (ii) first and second latch arms connected to the anchor and projecting outwardly away from the anchor in opposite first and second directions; (iii) first and second locking tabs projecting respectively from the first and second latch arms;
said first and second latch arms being selectively manually flexible relative to said anchor between: (i) a latched position in which the first and second locking tabs project into the recess; and (ii) an unlatched position in which the first and second locking tabs are withdrawn from the recess as compared to the latched position;
wherein said main wall, said first rail-constraining tab, said anchor, said first and second latch arms, and said first and second locking tabs are defined as part of a single one-piece molded polymeric construction.

2. The base for an electronics module as set forth in claim 1, wherein the recess is defined between first and second recess edges located respectively on the first and second sides of the recess, wherein said second edge of the recess comprises first and second spaced-apart fixed edge portions, and wherein said first and second latch arms are located between said first and second spaced-apart fixed edge portions.

3. The base for an electronics module as set forth in claim 2, further comprising a second rail-constraining tab located on said first side of said recess, wherein said first and second rail-constraining tabs are laterally spaced-apart from each other.

4. The base for an electronics module as set forth in claim 1, wherein said first and second latch arms are part of a latch frame that further comprises:
first and second outer legs that are connected respectively to and that extend transversely from the first and second latch arms;
a cross-bar that extends between and interconnects free ends of the first and second outer legs at a location spaced from the latch arms, wherein movement of said cross-bar away from said anchor moves both said first and second latch arms from their latched positions to their unlatched positions.

5. The base for an electronics module as set forth in claim 4, wherein said latch frame further comprises:
at least one resilient flexible biasing strut extending between and interconnecting the anchor and each of the first and second outer legs.

6. The base for an electronics module as set forth in claim 1, wherein:
said recess divides said rear face of said main wall into first and second portions, and said anchor is connected to said second portion of said rear face; and,
said first and second latch arms are spaced from said second portion of said rear face and are contained in and move between their latched and unlatched positions in a plane that lies parallel to said second portion of said rear face of said main wall.

7. The base for an electronics module as set forth in claim 4, wherein said latch frame is defined as part of said one-piece molded polymeric construction.

8. A base for an electronics module, said base comprising:
a main wall;
a recess defined in a rear face of the main wall, said recess adapted to receive first and second flanges of an associated mounting rail;
a first rail-constraining tab located on a first side of the recess;
a latch located on a second side of the recess that is opposite the first side of the recess, said latch comprising: (i) an anchor; (ii) first and second latch arms connected to the anchor and projecting outwardly away from the anchor in opposite first and second directions; (iii) first and second locking tabs projecting respectively from the first and second latch arms;
said first and second latch arms being selectively manually flexible between: (i) a latched position in which the first and second locking tabs project into the recess; and (ii) an unlatched position in which the first and second locking tabs are withdrawn from the recess as compared to the latched position;
wherein said first and second latch arms are part of a latch frame that further comprises:
first and second outer legs that are connected respectively to and that extend transversely from the first and second latch arms;
a cross-bar that extends between and interconnects free ends of the first and second outer legs at a location spaced from the latch arms, wherein movement of said cross-bar away from said anchor moves both said first and second latch arms from their latched positions to their unlatched positions;
said base for an electronics module further comprising a tool insertion slot defined between said cross-bar and said anchor, said tool insertion slot adapted to receive a tool used for moving said cross-bar away from said anchor so as to move said first and second latch arms from their latched positions to their unlatched positions.

9. A base for an electronics module, said base comprising:
a main wall;
a recess defined in a rear face of the main wall, said recess adapted to receive first and second flanges of an associated mounting rail;
a first rail-constraining tab located on a first side of the recess;
a latch located on a second side of the recess that is opposite the first side of the recess, said latch comprising: (i) an anchor; (ii) first and second latch arms connected to the anchor and projecting outwardly away from the anchor in opposite first and second directions; (iii) first and second locking tabs projecting respectively from the first and second latch arms;
said first and second latch arms being selectively manually flexible between: (i) a latched position in which the first and second locking tabs project into the recess; and (ii) an unlatched position in which the first and second locking tabs are withdrawn from the recess as compared to the latched position;
wherein said first and second latch arms are part of a latch frame that further comprises:
first and second outer legs that are connected respectively to and that extend transversely from the first and second latch arms;
a cross-bar that extends between and interconnects free ends of the first and second outer legs at a location spaced from the latch arms, wherein movement of said cross-bar away from said anchor moves both said first and second latch arms from their latched positions to their unlatched positions;
said base further comprising first and second stops connected to said main wall, wherein:
said first and second stops are spaced from said cross-bar when said first and second latch arms are in their latched positions;
said first and second stops are contacted by and limit movement of said cross-bar away from said anchor when said first and second latch arms are moved to their unlatched positions.

10. A rail attachment feature for an electronics module comprising:
a recess adapted to receive an associated mounting rail;
at least two spaced apart tabs located adjacent a first edge of the recess and adapted to capture a first flange of the associated mounting rail in the recess;
a fixed anchor located adjacent a second edge of the recess;
first and second flexible resilient latch arms located adjacent the second edge of the recess, said first and second flexible latch arms comprising respective inner ends connected to the fixed anchor and comprising respective outer ends spaced from the anchor and to which first and second locking tabs are respectively connected, wherein said first and second locking tabs project beyond the second edge of the recess and are adapted to capture a second flange of the associated mounting rail in the recess when the first and second latch arms are in respective latched positions, and wherein said first and second locking tabs do not project beyond the second edge of the recess when the first and second latch arms are in respective unlatched positions;
said first and second latch arms located in a common plane and flexible relative to said anchor in said common plane between their respective latched and unlatched positions;
said rail attachment feature further comprising a cross-bar through which said respective outer ends of said first and second latch arms are interconnected and that moves relative to said fixed anchor, such that movement of said cross-bar away from said anchor in said common plane moves said first and second latch arms relative to said anchor in said common plane from their respective latched positions to their respective unlatched positions.

11. The rail attachment feature as set forth in claim 10, wherein the first and second locking tabs include respective ramped surfaces that extend away from said second edge of the recess as they extend deeper into said recess.

12. The rail attachment feature as set forth in claim 10, wherein said second edge of said recess includes first and second spaced-apart fixed edge portions, and wherein said first and second latch arms are located between said first and second spaced-apart fixed edge portions.

13. The rail attachment feature as set forth in claim 10, wherein said at least two spaced apart tabs and said first and second flexible resilient latch arms are defined as part of the same one-piece molded polymeric construction.

14. The rail attachment feature as set forth in claim 10, wherein said anchor is connected to a wall, and wherein said first and second latch arms and said cross-bar are spaced from said wall.

15. A rail attachment feature for an electronics module comprising:
a recess adapted to receive an associated mounting rail;

at least two spaced apart tabs located adjacent a first edge of the recess and adapted to capture a first flange of the associated mounting rail in the recess;

first and second flexible resilient latch arms located adjacent a second edge of the recess, said first and second flexible latch arms comprising respective first and second locking tabs connected thereto, wherein said first and second locking tabs project beyond the second edge of the recess and are adapted to capture a second flange of the associated mounting rail in the recess when the first and second latch arms are in respective latched positions, and wherein said first and second locking tabs do not project beyond the second edge of the recess when the first and second latch arms are in respective unlatched positions;

said first and second latch arms comprising respective inner ends connected to a fixed anchor and comprising respective outer ends from which the first and second locking tabs respectively extend, wherein said outer ends of said first and second latch arms are interconnected through a cross-bar that moves relative to said fixed anchor, and wherein movement of said cross-bar away from said anchor moves said first and second latch arms in said plane from their respective latched positions to their respective unlatched positions;

said first and second latch arms located in a common plane and movable in said common plane between their respective latched and unlatched positions;

said rail attachment feature further comprising at least one fixed stop that limits movement of the cross-bar away from the anchor.

16. The rail attachment feature as set forth in claim 15, wherein a tool insertion slot is defined between said cross-bar and said anchor.

17. An electronics module comprising:

a base including a recess adapted to receive an associated mounting rail;

at least one rail constraining tab located adjacent a first side of the recess and adapted to capture a first flange of the associated mounting rail in the recess;

a fixed anchor located adjacent a second side of the recess;

first and second flexible resilient latch arms located adjacent the second side of the recess, said first and second flexible latch arms comprising respective inner ends connected to the fixed anchor and comprising respective outer ends spaced from the anchor and to which first and second locking tabs are respectively connected, wherein said first and second locking tabs project into the recess and are located to capture a second flange of the associated mounting rail in the recess when the first and second latch arms are in respective latched positions, and wherein said first and second locking tabs are withdrawn from the recess when the first and second latch arms are in respective unlatched positions;

wherein said first and second latch arms located in a common plane and move between their respective latched and unlatched positions in said common plane; and wherein said first and second latch arms are part of and interconnected by a latch frame including a cross-bar that is resiliently movable relative to said base in said common plane such that movement of said cross-bar in said common plane relative to said fixed anchor resiliently moves said first and second latch arms from their respective latched positions to their respective unlatched positions.

* * * * *